United States Patent [19]
Peterson et al.

[11] 3,961,800
[45] June 8, 1976

[54] STUB COLLET
[75] Inventors: Anders Adolf Peterson, Elmira; William J. Cummiskey, Horseheads, both of N.Y.
[73] Assignee: Hardinge Brothers, Inc., Elmira, N.Y.
[22] Filed: Oct. 10, 1974
[21] Appl. No.: 513,833

[52] U.S. Cl. .................................. 279/58; 279/54; 279/55
[51] Int. Cl.² ........................................ B23B 31/12
[58] Field of Search .................. 279/43, 49, 46, 54, 279/55, 57, 1 P, 58, 51, 15 J

[56] References Cited
UNITED STATES PATENTS

| 986,689 | 3/1911 | Clark | 279/51 |
|---|---|---|---|
| 1,509,997 | 9/1924 | Fri | 279/55 X |
| 1,827,795 | 10/1931 | Matthews | 279/55 |
| 2,982,557 | 5/1961 | Anschutz | 279/54 X |
| 3,542,384 | 11/1970 | Speed | 279/46 |
| 3,595,593 | 7/1971 | Gold | 279/57 |

FOREIGN PATENTS OR APPLICATIONS

| 6,516,460 | 6/1966 | Netherlands | 279/55 |
|---|---|---|---|
| 566,092 | 12/1944 | United Kingdom | 279/58 |
| 738,826 | 10/1955 | United Kingdom | 279/54 |

*Primary Examiner*—Othell M. Simpson
*Assistant Examiner*—W. R. Briggs
*Attorney, Agent, or Firm*—Shlesinger, Arkwright, Garvey & Dinsmore

[57] ABSTRACT

A collet assembly comprising a spring body member having a cylindrical rear portion and a plurality of spring fingers extending axially therefrom, with an annular bead on the external periphery of the spring fingers near the distal end thereof. Work gripping pads for gripping the exterior of the workpiece are mounted on each of the fingers, and the pads have a groove on the interior thereof for mounting the pads on the beads on the spring fingers. The pads have an exterior surface which forms a frusto-conical cam surface for cooperative engagement with an actuator sleeve, and the pads are free to rock slightly axially on the beads when the collet is opened or closed.

Also disclosed are the spring body and the pads for use therewith.

12 Claims, 6 Drawing Figures

STUB COLLET

This invention relates to a stub collet assembly. More particularly, this invention relates to stub collet assembly wherein the spring body portion of the collet is separate from the cam surface or work gripping surface of the collet assembly.

BACKGROUND AND OBJECTS

Many variations of collets have evolved over the years, however, the most commonly used collet is one which has a tubular body portion and a plurality, usually three or four, spring fingers extending axially from the body portion. On the exterior of the distal end of the spring fingers is formed a cam surface, while on the interior is formed a work gripping surface. The collet fits into the spindle of a lathe or other machine tool, and the spindle has a tapered cam surface which coacts with the cam surface on the collet such that relative axial movement between the collet and the spindle will cause flexing of the spring fingers and thus an opening or closing of the collet. Such types of collets are illustrated in U.S. Pat. No. 2,557,301.

Another commonly used collet is similar to that previously discussed but uses replaceable work gripping pads secured within the collet. The pads may have any desired work gripping configuration such as round (of any diameter), hexagonal, square, polygonal, or irregular shape, so that a great variety of work may be accommodated within a single collet merely by changing the pads. Such a construction is illustrated in U.S. Pat. No. 2,234,603.

The collet opening or closing action and the resultant flexure of the spring fingers is repeated rapidly in modern machines and in the high speed production-type lathes, the opening and closing cycles occur quite frequently. A frequent problem with such collets in these machines is that breakage occurs in the leaf section of the spring fingers, immediately behind the cam surface. The possibility of such breakage is accentuated when a short workpiece is gripped at the front of the collet, i.e., is not inserted very far into the collet. This breakage renders the entire collet useless. Additionally, if the breakage occurs during a machining operation, the workpiece would probably be damaged, and a safety hazard may be created by a flying workpiece or collet part.

An additional possible contributing factor to the breakage in conventional collets is the heat treatment necessarily used. The head end of the collet must be heat treated to harden it for wear resistance, whereas the body of the collet must be less hard in order to achieve the requisite spring tension. Thus, the two heat treatments are to a certain extent conflicting and may cause metallurgical stresses which contribute to weakness near the juncture of the head and the body of the collet.

Accordingly, a primary object of this invention is to overcome the disadvantages of prior art collets.

Another object of this invention is to provide a collet assembly which utilizes a spring body member and separate but cooperating work gripping jaws.

Another object of this invention is to provide a spring body member which is replaceable without replacing the entire collet assembly.

A further object of this invention is to provide work gripping pads which has the cam actuating surface and work gripping surface thereon.

Still a further object of this invention is to provide a collet assembly capable of accurate workpiece centering.

Still a further object of this invention is to provide a collet assembly wherein the work gripping pads having the cam actuating surface and work gripping surface thereon are removably attached to the spring body.

A further object of this invention is to provide a collet wherein the spring tension of the spring body opens the collet to release the workpiece when the actuator sleeve is released.

Yet another object of this invention is to provide a collet assembly wherein the head and body portions may be separately heat treated without introducing conflicting side effects.

DESCRIPTION OF THE DRAWINGS

These and other objects and advantages of this invention will become apparent when considered in light of the following description and claims when taken together with the accompanying drawings in which:

DESCRIPTION OF THE INVENTION

Figure 1:
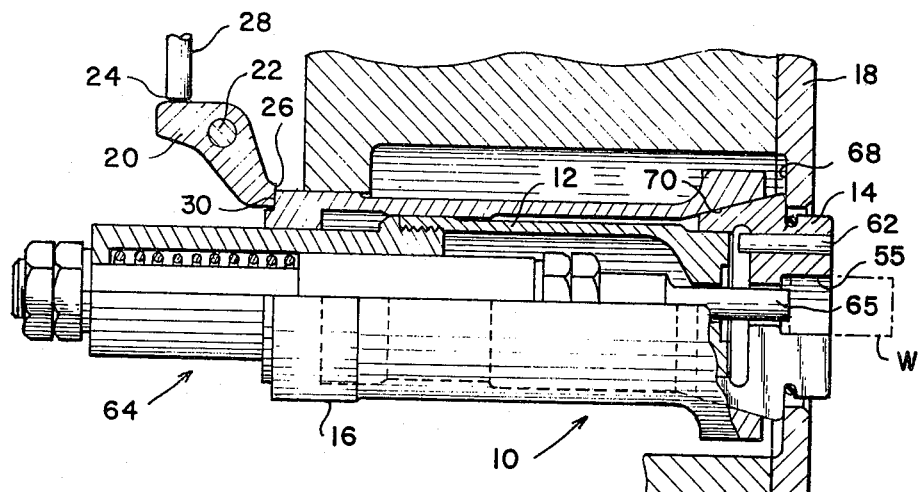
FIG. 1 is a plan view in partial section of a collet assembly according to this invention.
Figure 2:
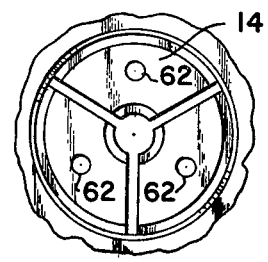
FIG. 2 is a right end view of the assembly of FIG. 1.

This invention will now be described with more particularity, and referring to FIG. 1, the collet assembly of this invention generally designated 10 is seen to include a spring body 12 and a plurality of collet pads 14. The spring body 12 with the pads 14 mounted thereon are slideably received in an actuator sleeve 16 mounted within the spindle 18 of a lathe. The actuator sleeve and spindle are conventional, and are only described to the extent necessary for clarification of their relationship to the collet assembly of this invention.

An actuating toggle 20 is mounted on a shaft 22 and is provided with two bearing surfaces 24 and 26. A push rod 28 is positioned so as to contact the bearing surface 24, while the bearing surface 26 is arranged so as to contact surface 30 on the rear of actuator sleeve 16. By this construction if the push rod 28 is pressed downwardly, the actuator sleeve is moved to the right as seen in FIG. 1, and release of the push rod permits movement of actuator sleeve 16 to the left.

Figure 5:
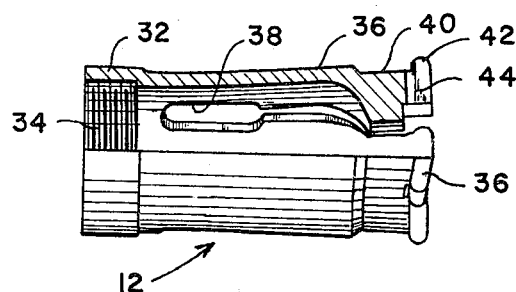
FIG. 5 is an elevational view in partial section of the spring body member used in the collet assembly of this invention in a relaxed state.
Figure 6:
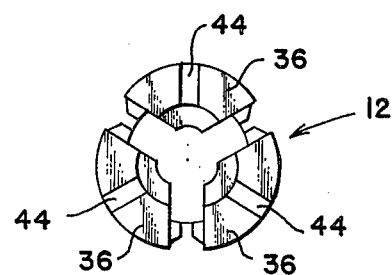
FIG. 6 is a right end view of the spring body of FIG. 5.

Referring to FIGS. 5 and 6, the spring body 12 has a tubular portion 32 at one end thereof and which is threaded as at 34. A plurality of spring fingers 36 extend forwardly from the tubular portion 32 and are separated by a plurality of slots 38. At the distal end of the spring fingers 36, there is a depressed annular groove 40, and immediately ahead of this groove 40 is a raised annular rib 42.

Additionally, in the front face of each of the fingers 36 is a slot 44.

Figures 3, 4:
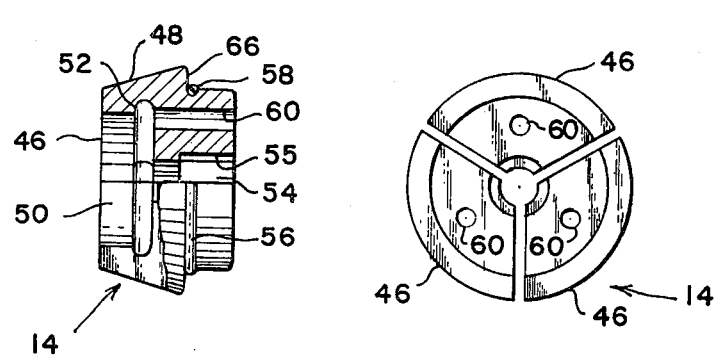
FIG. 3 is an elevational view in partial section of the collet pads of this invention.
FIG. 4 is a right end view of the assembled pads of FIG. 3.

Referring now to FIGS. 3 and 4, the pads 14 comprise three members 46, each of which has a cam surface 48 machined on the exterior surface thereof. On the interior of the members 46 is a surface 50 which mates with the groove 42 of the spring body, and also there is a groove 52 configured so as to cooperate with the rib 42 on the spring body 12. An opening 54 is provided as by boring into the end of the members 46 and is of any diameter desired for gripping the size workpiece to be used by the work gripping surface 55.

An annular groove 56 is provided and receives an O-ring 58. The O-ring is used to hold the three members 46 in the proper relationship until they are installed on the spring body 12. An axial bore 60 is provided in each of the members 46 for receiving an alignment pin 62 as shown in FIG. 1.

Also, as seen in FIG. 1, a stop member 64 of conventional construction is installed in the spring body 12 and secured by means of the threads 34. The stop member 64 includes a stop projection 65 which engages the workpiece W to limit the amount of its insertion into the collet. Of course, use of the stop is optional. The stop projection 65 may also have a carefully controlled diameter and may thereby serve to limit the amount of closing of the collet, and control the amount of gripping pressure on a short workpiece in the front of the collet.

To assembly the collet of this invention, the pad members 46 are positioned over the ribs 42 on the spring body 12 with the surfaces 50 engaging the surfaces 40 of the spring body 12. The spring body-pad assembly is then inserted into the actuator sleeve 16 which in turn is assembled in the spindle 18. The front surface 66 of the pad members 46 abuts the surface 68 of the spindle, thus limiting axial movement of the collet assembly within the spindle. The cam surface 70 on the actuator sleeve 16 cooperates with the cam surface 48 on the pad members 46.

In operation, with the collet initially open, a workpiece W is inserted into the work gripping bore 55 so that it abuts the stop pin 65 which is preset to the desired depth. To close the collet and thus grip the workpiece, the push rod 28 (or other suitable means) is actuated to operate through the toggle 20 and shift the actuator sleeve 16 to the right as seen in FIG. 1. With the pad members 46 in abutment with the surface 68 of the spindle, the cooperating cam surfaces 70 and 48 serve to close the collet radially inwardly and thus grip the workpiece W. By virtue of the pins 62 in the slots 44, a slight rocking movement of the pad members 46 on the rib 42 may be accommodated. In practice, this rocking movement would only be a few thousands of an inch.

When the spring body 12 is manufactured, it is heat treated in an open position as shown in FIGS. 5 and 6 so that the natural at-rest state of the spring fingers is in an open position, and when the collet is closed, it is against the spring bias. Thus, when the collet is opened as by release of the push rod 28, the spring tension of the fingers 36 will effectuate opening of the collet without sticking. This opening, while preventing sticking, is also assisted by the slight rocking movement of the pads on the rib 42.

By virtue of this invention, if the spring fingers 36 should break, it is not necessary to replace the entire collet, but only the spring body, inasmuch as the pads 14 may be used on a new spring body. In this manner, substantial savings may be made. Additionally, collet pads for different sizes and shapes of workpieces may be used on the same spring body, thus effectuating a further savings in machine tool costs.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

We claim:
1. A spring body for use with work gripping pads having cam surfaces comprising:
   a. a tubular body having a rear section and a plurality of spring fingers extending axially therefrom,
   b. a circumferentially disposed segment of a raised annular bead on the outer surface of said fingers at the distal ends thereof for receiving and positioning work gripping pads thereon, and
   c. a recess formed in the front face of each of said fingers for receiving a locating pin for positioning work gripping pads.
2. A spring body as in claim 1 and including:
   means for mounting a work stop abutment in said body.
3. A spring body as in claim 2 and wherein:
   said fingers are spring tensioned so that in a relaxed position said fingers are radially expanded and in a work gripping position said fingers are under tension.
4. Work gripping pads for mounting on the exterior of a spring body comprising:
   a. an arcuate sector body having a cam surface on a portion of the exterior thereof, said cam surface tapering outwardly from a first radius at one end of said body toward and terminating at a second radius near the center of said body,
   b. a cylindrical external surface having a radius less than said second radius and extending from the other end of said body toward said cam surface,
   c. a circumferentially disposed segment of an annular groove on the interior surface of said body for mounting on and mating with a corresponding bead on the spring body, and
   d. a work gripping surface on the interior of said body.
5. Work gripping pads as in claim 4 and including:
   an annular groove in the exterior of said body between said cam surface and said cylindrical surface for receiving an elastic holding ring for holding a plurality of said pads in assembled relationship.
6. A collet assembly comprising:
   a. a spring body member having a cylindrical rear portion and a plurality of spring fingers extending axially therefrom,
   b. a circumferentially disposed segment of a raised annular bead near the distal end of each of said fingers
   c. work gripping pads mounted on each of said fingers, said pads having a circumferentially disposed segments of a groove on the interior thereof for mounting said pads on the beads on said fingers,
   d. said pads each having exterior surfaces which collectively form a frusto-conical cam surface for cooperative engagement with an actuator cam surface, e. said pads further including an internal work gripping surface, and f. said pads being free to rock slightly axially on said annular bead when said collet is opened or closed.

7. A collet as in claim 6 and wherein:
said spring fingers are tensioned so that when said collet is opened said fingers urge said pads radially outwardly to a work release position.

8. A collet as in claim 7 and including:
a work stop abutment secured in said body member.

9. A collet as in claim 7 and wherein:
said pads include an annular groove on the exterior thereof for receiving an elastic ring for holding said pads in assembled relationship on said body member.

10. A collet as in claim 7 and including:
pin means associated with each of said pads for aligning said pads on said fingers.

11. A collet as in claim 10 and wherein:
said pin means includes dowel pins passing axially through said pads and engaging a recess in said fingers.

12. A collet as in claim 7 and including:
a. an actuator sleeve around said spring body member,
b. said actuator sleeve having an actuator cam surface,
c. whereby relative axial movement of said actuator sleeve and said pads causes opening or closing of said collet.

* * * * *